United States Patent Office 3,133,138
Patented May 12, 1964

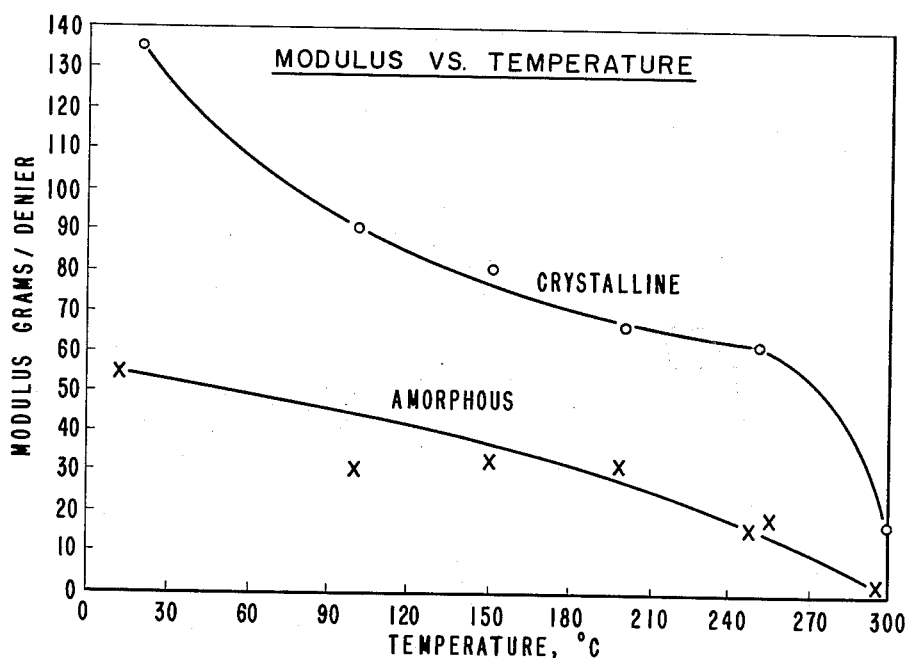

3,133,138
STRETCHING AND HEAT CRYSTALLIZATION OF POLY(META - PHENYLENE ISOPHTHALAMIDE) FIBERS
Earl Logan Alexander, Jr., Wilmington, Del., assignor to E. I. du Pont de Nemours and Company, Wilmington, Del., a corporation of Delaware
Filed Dec. 19, 1958, Ser. No. 781,574
4 Claims. (Cl. 264—290)

This invention relates to a new process for inducing crystallization in synthetic fibers, particularly fibers of wholly aromatic polyamides.

Wholly aromatic polyamides are a new class of synthetic polymers which offer a valuable combination of properties. Such polymers and their advantages are described in detail in copending application of Hill, Kwolek, and Sweeny, Serial No. 642,928, filed February 28, 1957, now abandoned, and its continuation-in-part application by the same inventors, Serial No. 774,156, filed November 17, 1958, now Patent No. 3,094,511, the disclosures of both of which are incorporated into this specification. As disclosed in those applications, wholly aromatic polyamides can be shaped into fibers, films, and other structures having outstanding resistance to thermal degradation, very high melting point, general inertness to corrosive and degrading atmospheric conditions, and retention of excellent physical properties under extended exposure to high temperatures. A wide variety of utilities are indicated in the copending application which benefit by one or more of the superior properties of these wholly aromatic polyamides.

In order to realize fully the potentialities of wholly aromatic polyamides in fiber form, many utilities require that the fibers be in a crystalline state. Crystallization of wholly aromatic polyamides in the form of a shaped structure, particularly a fiber, while maintaining the original shape, dimensions and degree of orientation has posed a problem. Obvious and known methods of inducing crystallization in polymeric materials have not proved applicable for this purpose. For example, it is well known that known polyamides such as nylons of commerce are readily crystallized by exposure to even a moderate degree of temperature in the range of 40–50° C., particularly for example in the presence of atmospheric moisture. Such crystallization can readily be imparted to the polymer in fiber form or otherwise, and, as a matter of fact, crystallization of nylon fibers is automatically accomplished in normal processing. Crystallization of some polymeric materials can be achieved by exposure to common organic solvents either in the liquid or the vapor state. For example, polyester materials such as polyethylene terephthalate can frequently be crystallized in fiber form by exposure to an acetone bath at normal room temperatures. Such readily performed process steps are not suitable, however, for inducing crystallization in wholly aromatic polyamides.

It is an object of this invention to provide a new process for crystallizing amorphous fibers of wholly aromatic polyamides, which fibers are uniformly oriented. It is a further object to provide a process for crystallizing uniformly oriented amorphous fibers of wholly aromatic polyamides whereby the original shape and oriented condition of the fibers are retained, while at the same time the dimensional stability and physical properties of the fibers are improved. Another object is to provide a process whereby a running threadline of oriented fibers of a substantially entirely aromatic polyamide is treated rapidly and continuously to induce therein a high level of crystallinity and a concomitant improvement in physical properties. Other objects of this invention and means for attaining them will be apparent from the following specification and the attached claims.

According to this invention a uniformly oriented but amorphous strand such as a yarn, of poly(meta-phenylene isophthalamide) spun into fibers and then drawn at temperatures below 220° C. to from 3 to 6 times their original length, is heated at temperatures between 300° and 350° C. for a period of time of at least 0.2 second while the yarn is held under tension until crystallized in the oriented condition. Preferably, the temperature of the heat-supplying means is higher than 300° C. and the time of exposure of the yarn to heat is between 0.3 second and about 5 seconds. For reasons of economics, it is desirable to crystallize continuous threadlines of oriented aromatic polyamides on the run, by running the threadline through a suitable heat-supplying means. When this is done, it is, of course, convenient that the threadline be maintained during the heating process under non-drawing tension to retain the oriented condition and this tension should generally be sufficient to prevent the fibers from retracting more than 10% of their original length during the crystallization process.

Yarns and other structures processed according to this invention can be oriented by drawing the material, after shaping to increase the length by 3 to 6 times the original length. Drawing increases the degree of molecular alignment with the fibers and along the fiber axis. Structures treated according to this invention should be highly and uniformly oriented. Many satisfactory drawing processes for synthetic fibers are known and described in the prior art. Monofilament threads or multifilament yarns can be treated in the drawing and crystallizing processes, depending on the product desired. Both drawing and crystallizing steps can be combined into one continuous process on the same moving threadline, provided that any particular segment of yarn be uniformly oriented before it is crystallized. While different drawing methods can be used, it is preferable, in order to develop maximum crystallinity, that the yarn be drawn in contact with water, either as steam or as liquid water, prior to crystallization.

The present crystallization treatment may be applied to structures of any of the aromatic polyamides of the copending application mentioned above. Best results are obtained with those polymers having a high degree of structural symmetry. Thus, polymers without substituent groups on the aromatic nuclei are preferred to those with substitution on only one nucleus, or those with asymmetrical substituent groups. Polyamides derived from aromatic intermediates in which reactive groups are oriented all meta to one another, or all para to one another, are preferable to those containing both meta- and para-oriented groups. Poly(meta-phenylene isophthalamide) has proved to be particularly well suited for the process of this invention and is the most preferred species, particularly in filamentary form.

While this invention is particularly applicable to fibers in the form of filaments, yarns and fabrics, it can equally well be applied to ribbons and films of aromatic polyamides.

The nature of the heat-supplying means is not critical to this invention. The heat may be supplied by contact with a hot surface such as metal or a ceramic plate or pin or by a hot gaseous atmosphere or by a fluidized bed of small particles of such materials as metal, sand, or the like. Any of these heating methods may be used alone or in combination or in conjunction with radiant heating means as well as by other methods suitable for supplying heat of the intensity indicated. When the crystallization process is conducted on a continuous basis as already indicated, it is frequently advantageous to employ within the heating region a yarn holdup device which will simultaneously advance the yarn, keep it under tension and maintain it within the heating zone so that it is exposed to the necessary heat for the indicated period of time. It is possible to employ suitable apparatus which will permit the simultaneous crystallization of a number of threadlines within the same heating zone.

The following examples illustrate particular embodiments of this invention.

EXAMPLE 1

Fibers of poly(meta-phenylene isophthalamide) are prepared as described in copending application Serial No. 642,928 to give a yarn of 30 filaments. The yarn is drawn to 3.5 times its original spun length through atmospheric steam to give a highly oriented but amorphous fiber. Following orientation, the yarn is led over a hot plate, heated at 345° C. The plate is 15 inches long and the yarn contacts it while under tension of 45 grams and is wound up at a speed of 10 yards per minutes, giving a contact time of the yarn with the hot plate of about 2.5 seconds. The yarn obtained in this process has a very high degree of crystallinity as shown by X-ray diffraction pattern analysis and outstanding dimensional stability. The tenacity of the yarn before the heat treatment is approximately 2.9 grams per denier; while following the crystallization step, the tenacity is 3.4 grams per denier measured at the same temperature. Even more significant are the improved modulus and the constancy of elongatability of the yarn over a wide range of temperatures as shown in Table I and the figure.

*Table I*

| Temperature, ° C. | Elongation to Break, percent | |
|---|---|---|
| | Amorphous Yarn | Crystalline Yarn |
| 25 | 40 | 25 |
| 150 | 35 | 20 |
| 200 | 50 | 22 |
| 220 | 110 | 25 |
| 250 | | 27 |
| 300 | | 27 |

As the table shows, for uses requiring retention of elongation properties at very high temperatures the crystalline yarn is much superior to the amorphous yarn.

A sample of amorphous yarn (215 denier, 72 filaments, 3.6 t.p.i. twist) is made into a plain weave fabric, 56 picks by 66 ends per inch. The fabric is boiled-off and during this treatment shrinks approximately 7%. This fabric is then exposed to repeated cycles of immersion in boiling water followed by the application of dry heat (hot air) at a temperature of 150° C. The amorphous fabric shrinks repeatedly to give a total shrinkage, after ten such cycles, of more than 30%. A similar fabric is then prepared from yarns which have been crystallized in a manner similar to that described earlier in this example. The initial shrinkage is less than 5%, and there is no further change in fiber shrinkage following repeated cyclic exposures to wet and hot-dry conditions.

EXAMPLE 2

In an experiment similar to that described above, fibers of poly(meta-phenylene isophthalamide) are spun and drawn 4.2X to give a yarn of 200 denier, 100 filaments. After drawing, this yarn is crystallized by passing it twice around a hot roller of 12 inches diameter heated to a surface temperature of 320° C. The two passes are kept separate by using a skewed idler roll. The yarn is advanced at a speed of 100 yards per minute and the contact time with the hot surface is 1.2 seconds. Following the heat treatment, the yarn is examined by X-ray diffraction pattern analysis and found to be highly crystalline. The physical properties of the yarn treated in this way are comparable to those obtained in Example 1. As before, high temperature elongation to the break is rendered much more constant and the shrinkage on repeated wet and hot-dry treatment is very greatly reduced.

EXAMPLE 3

Amorphous yarn of poly(meta-phenylene isophthalamide) is prepared as in Example 1 and oriented by drawing 4.2X. The yarn is crystallized in a running process by exposure to air heated to a temperature of 340° C. in a slotted tube 3 feet long. The yarn is led through this tube at a speed of 20 yards per minute giving an approximate contact time with the hot air of 3 seconds. The threadline during this process is maintained under a tension of 20 grams, to keep the yarn from shrinking excessively during the crystallization treatment. Following crystallization, the yarn is wound up. Samples of the yarn are analyzed by X-ray diffraction pattern analysis and found to be highly crystalline. Properties of the yarn crystallized by the hot air treatment are comparable to those obtained by the hot plate treatment.

A preferred embodiment of the present invention is that which combines a number of operations in application to a single running threadline, as already indicated. For example, filaments from wholly aromatic polyamides, spun from a solution of the polymer in dimethylacetamide, are advantageously extracted with water to remove residual solvent before drawing. The following example shows a preferred operation in which extraction, two-stage drawing and crystallization are practiced sequentially on a single moving threadline.

EXAMPLE 4

Poly(meta-phenylene isophthalamide) of inherent viscosity of 1.7 is spun into a 50 filament yarn from a 17% solution of the polymer in dimethylacetamide containing 2.9% $CaCl_2$ based on the total solution weight. After spinning, the amorphous unoriented yarn is drawn 4.0X through a bath of hot water which also extracts residual solvent and calcium chloride. A second pass through hot water completes the extraction, no further drawing being employed at this step. From the second bath, the yarn is drawn 1.2X further, to a total draw of 4.8X, employing a heated plate held at 200° C. in contact with the yarn. This temperature is not sufficient to cause crystallization. The threadline then passes immediately over a second hot plate (330° C.) which induces a high degree of crystallization in the yarn. The final product, as wound up, is a 100 denier 50 filament yarn, uniformly oriented, highly crystalline and having superior physical properties as follows:

| | | |
|---|---|---|
| Tenacity | g.p.d | 6.4 |
| Elongation | percent | 25 |
| Initial Modulus | g.p.d | 150 |
| Flex test | cycles | 700,000 |
| Boil-off shrinkage | percent | 1 |

In addition to the crystallization steps shown above, it has been found that yarns from uniformly oriented wholly aromatic polyamides can be crystallized equally well by running the yarn through a hot metal bath, through a fluidized bed of fine sand particles, or by exposure to an infrared furnace. The necessary requirement in these processes is that the yarn shall be exposed to a temperature of between 220° C. and 350° C. and that the contact time shall be a least 0.2 second and preferably between 0.3 and about 5.0 seconds. The lower range of crystallization temperatures usually requires a somewhat longer exposure time.

EXAMPLE 5

A wholly aromatic polyamide is prepared from 4,4'-diaminodiphenyl ether and terephthaloyl chloride as described in copending application Serial No. 642,928. The yarn as spun is drawn in atmospheric steam 4.0X to give an amorphous highly oriented material. X-ray diffraction studies shown that the crystallinity of this yarn is very low. In a treatment similar to that described in Example 1 the oriented amorphous yarn is passed, while under tension, over a hot plate the surface of which is at a temperature of 320° C. to give a crystalline product, as shown by X-ray diffraction pattern analysis. Property improvements in this yarn are similar to those previously described.

Similar results are obtained with other similar aromatic polyamides described in the above-mentioned copending applications. Symmetrical molecular structures, as already stated, are preferable. Other preferred structures include the following:

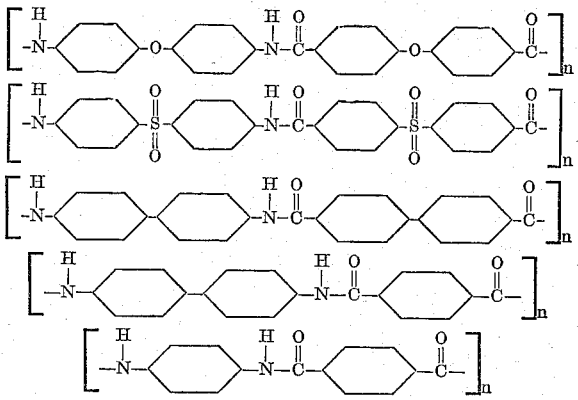

and the like, where $n$ is a large whole number of the order of 30 or more.

It is essential for the successful practice of this invention that the wholly aromatic polyamide employed be of high molecular weight. Polymers with an inherent viscosity of at least 0.6 are necessary as otherwise the desired level of physical properties is not obtained. For maximum advantages both in degree of crystallinity and in the fiber properties themselves, it is preferred that the polymer used in forming the fibers have an inherent viscosity of 0.8 or higher as in the preferred species illustrated.

The claimed invention:

1. In the production of a strand of fibers spun from poly(meta-phenylene isophthalamide) having an inherent viscosity of at least 0.6 in concentrated sulfuric acid at 30° C. at a concentration of 0.5% by weight, which polyamide strand is amorphous in the as-spun condition, the improvement for forming an oriented crystalline strand which comprises drawing the amorphous strand at temperatures below 220° C. to 3–6 times the original length into a uniformly oriented amorphous strand and then heating the strand at temperatures between 300° and 350° C. for at least 0.2 second with the strand under tension until crystallized in the oriented condition, the tension being sufficient to prevent retraction by more than 10% of the original length and insufficient to draw the strand.

2. The process as defined in claim 1 wherein the oriented amorphous strand is maintained at substantially constant length during the step of heating at 300° to 350° C. until crystallized.

3. The process as defined in claim 1 wherein the strand is crystallized on the run, the oriented amorphous strand being heated at 300° to 350° C. by running over a heated surface.

4. The process as defined in claim 1 wherein the strand is drawn and crystallized in a continuous process, the strand being drawn during passage over draw rolls and then, during further continuous passage, being heated at a temperature of 300° to 350° C. to 0.3 to 5 seconds.

References Cited in the file of this patent
UNITED STATES PATENTS

| | | |
|---|---|---|
| 2,130,948 | Carothers | Sept. 20, 1938 |
| 2,199,411 | Lewis | May 7, 1940 |
| 2,212,772 | Graves | Aug. 27, 1940 |
| 2,244,192 | Flory | June 3, 1941 |
| 2,252,554 | Carothers | Aug. 12, 1941 |
| 2,277,125 | Martin | Mar. 24, 1942 |
| 2,296,202 | Hardy | Sept. 15, 1942 |
| 2,298,868 | Catlin | Oct. 13, 1942 |
| 2,307,846 | Miles | Jan. 12, 1943 |
| 2,389,655 | Wende | Nov. 27, 1945 |
| 2,509,741 | Miles | May 30, 1950 |
| 2,621,168 | Ross | Dec. 9, 1952 |
| 2,625,536 | Kirby | Jan. 13, 1956 |
| 2,756,221 | Caldwell | July 24, 1956 |
| 2,766,222 | Lum | Oct. 9, 1956 |
| 2,768,057 | Friederich | Oct. 23, 1956 |
| 2,831,834 | Magat | Apr. 22, 1958 |

FOREIGN PATENTS

| | | |
|---|---|---|
| 745,029 | Germany | Feb. 23, 1944 |
| 614,625 | Great Britain | Dec. 30, 1948 |
| 632,997 | Great Britain | Dec. 5, 1949 |
| 1,112,203 | France | Nov. 9, 1955 |
| 541,063 | Italy | Mar. 20, 1956 |
| 781,879 | Great Britain | Aug. 28, 1957 |

OTHER REFERENCES

Tobolsky: Scientific American, September 1957, pp. 121–126, 218, 133 and 134.